United States Patent
Cook et al.

(10) Patent No.: US 6,467,155 B1
(45) Date of Patent: Oct. 22, 2002

(54) TRANSFER CONTROL SYSTEM FOR PISTON INSERTION MACHINE

(75) Inventors: James A. Cook, Delphi; Brad A. Moore, Frankfort; Kevin R. Shaffer, West Lafayette; James L. Thien, Logansport; Robert L. Walters, Lafayette, all of IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/606,705

(22) Filed: Jun. 29, 2000

(51) Int. Cl.[7] ............................................. B23P 21/00
(52) U.S. Cl. ...................... 29/714; 29/888.044; 29/709; 29/712; 29/888.01; 700/77; 700/255
(58) Field of Search ................... 29/888.01, 888.011, 29/888.044, 434, 469, 525, 559, 709, 712, 714, 281.4, 407.09, 407.1; 700/23, 213, 13, 20, 56, 75–77, 178, 255 V, 258

(56) References Cited

U.S. PATENT DOCUMENTS

| | | | |
|---|---|---|---|
| 4,887,341 A | * 12/1989 | Sakimori et al. | 29/430 |
| 5,032,997 A | * 7/1991 | Kawagoe | 364/424.05 |
| 5,323,308 A | * 6/1994 | Yoshikura et al. | 364/140 |
| 5,397,510 A | * 3/1995 | Clark | 261/26 |
| 5,537,734 A | * 7/1996 | Belka et al. | 29/705 |
| 5,539,981 A | * 7/1996 | Burcham et al. | 29/888.061 |
| 5,619,782 A | * 4/1997 | Tanaka et al. | 29/407.1 |
| 5,974,650 A | * 11/1999 | Kawabata et al. | 29/468 |
| 6,047,472 A | * 4/2000 | Koch et al. | 29/888.01 |
| 6,131,389 A | * 10/2000 | Sorenson | 60/384 |
| 6,253,551 B1 | * 7/2001 | Lohmann et al. | 60/602 |

FOREIGN PATENT DOCUMENTS

| | | | | |
|---|---|---|---|---|
| DE | 19622731 A | * | 12/1997 | |
| JP | 401281832 A | * | 11/1989 | 29/888.044 |
| JP | 406226558 A | * | 8/1994 | 29/888.044 |

* cited by examiner

Primary Examiner—S. Thomas Hughes
Assistant Examiner—Jermie E. Cozart
(74) Attorney, Agent, or Firm—Andrew M Calderon

(57) ABSTRACT

A transfer control system for enabling technicians to insert a piston assembly into a cylinder of an engine block. The transfer control system ensures that only one technician at a single time is capable of controlling the insertion of the piston assembly into the cylinder of the engine block. The transfer control system has a proximity sensor and a first control system in communication with the proximity sensor. A second control system is in communication with the first control system.

15 Claims, 2 Drawing Sheets

TRANSFER CONTROL SYSTEM FOR PISTON INSERTION MACHINE

TECHNICAL FIELD

This invention relates generally to a transfer control system and, more particularly, to a transfer control system adapted for use with a piston insertion machine for inserting pistons into respective cylinders of an internal combustion engine.

BACKGROUND ART

The introduction of a piston assembly into a cylinder bore of a combustion engine is a complex and time consuming process. In order to accomplish this task, two technicians are required to insert the piston assembly into a respective cylinder of an engine block, a first technician is positioned at a front side of the engine block and a second technician is positioned at a rear side of the engine block.

The first technician inserts the piston assembly into a piston ring compressor which enables the piston rings to be compressed about grooves of the piston. Once the piston assembly is properly inserted within the piston ring compressor, the first technician then aligns the piston ring assembly with the cylinder bore and begins sliding the piston assembly through the piston ring compressor and into the cylinder bore. However, the first technician is unable to completely insert the piston assembly within the cylinder bore and, at the same time, align the connecting rod of the piston assembly with the crankshaft of the engine block. This is mainly due to the fact that the first technician does not have access to the rear portion of the engine block during the insertion process, and is thus unable to manipulate and/or connect the connecting rod to the crankshaft.

Thus, to properly connect the connecting rod of the piston assembly with the crankshaft, the second technician grasps the connecting rod (which is already partially inserted within the cylinder bore) from the rear side of the engine block, and slides the piston assembly toward the crankshaft. As the second technician slides the piston assembly towards the crankshaft, the connecting rod is aligned with the crankshaft. Thus, by being positioned at the rear side of the engine block it is more advantageous for the second technician to complete the insertion and aligning process.

Realizing that the engine block may be very large, however, the first and second technicians are spaced apart from one another and may not be able to adequately communicate with one another during the inserting and aligning process. This being the case, both the first and second technician can inadvertently attempt to insert the piston assembly within the cylinder bore at the same time. This can result in misalignment of the connecting rod, and can lead to inefficiencies in the assembly process. This may also result in the first technician sliding the piston assembly too far into the cylinder block, thus damaging the connecting rod or the crankshaft.

The present invention is directed to overcoming one or more of the problems as set forth above.

DISCLOSURE OF THE INVENTION

In one aspect of the present invention a transfer control system is provided. The transfer control system has a proximity sensor and a first and second control system.

In another aspect of the present invention a piston insertion machine having a transfer control system is provided. The piston insertion machine has a frame and a piston ring compressor. A proximity sensor is positioned on an end of the piston ring compressor, and a first and second control system is provided.

In still another aspect of the present invention, a method of using a transfer control system is provided. The method has the steps of controlling a piston ring compressor, and transferring the control of the piston ring compressor from a first control system to a second control system.

BEST MODE FOR CARRYING OUT THE INVENTION

Figures 1, 2:
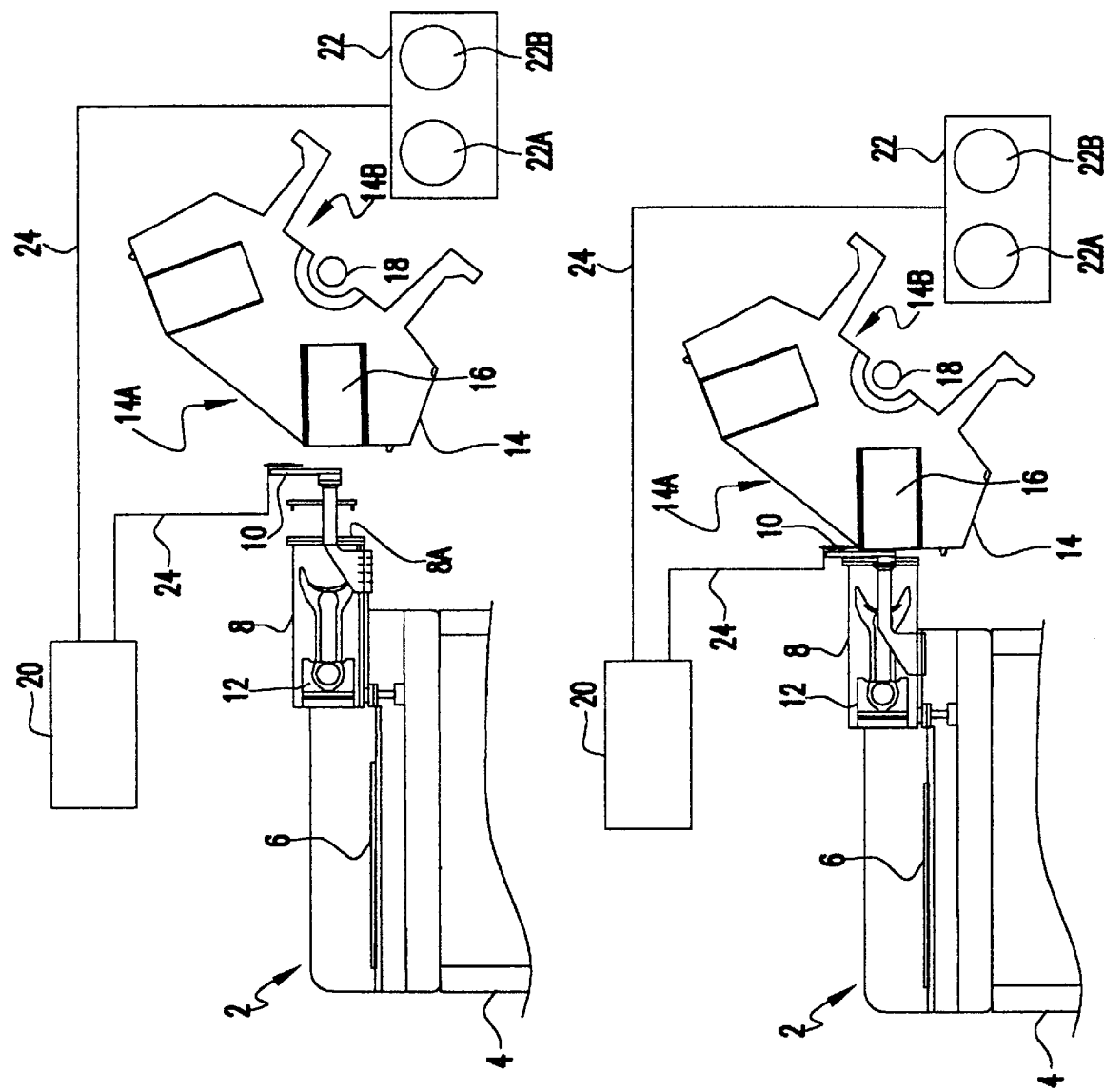
FIG. 1 shows a diagrammatic side view of a transfer control system of the present invention adapted for use with a piston insertion machine.
FIG. 2 shows a diagrammatic side view of the transfer control system with a proximity sensor in a proximity of a front side of an engine block.

FIG. 1 shows a transfer control system of the present invention adapted for use with a piston insertion machine. The piston insertion machine is depicted generally as reference numeral 2 and includes a frame 4 and a base 6. A piston ring compressor 8 is positioned on the base 6 and includes a proximity sensor 10 extending from an end 8a of the piston ring compressor 8. A piston assembly 12 is housed within the piston ring compressor 8.

The piston ring compressor 8 is positioned on a front side 14a of an engine block 14, and is preferably aligned with a cylinder 16. The cylinder 16 is bored into the engine block 14 and extends to a rear side 14b of the engine block 14. A crankshaft 18 is positioned on the rear side 14b of the engine block 14.

Still referring to FIG. 1, a first control system 20 and a second control system 22 is provided. The first control system 20 is positioned in front of the engine block 14 and is in communication with the proximity sensor 10 and the piston insertion machine 2 via a communication link 24 such as, for example, a cable or RF link. The second control system 22 is positioned near the rear of the engine block 14 and is in communication with the first control system 20 via the communication link 24. The second control system 22 is also in communication with the piston insertion machine 2 via the first control system 20, or alternatively may be in communication directly with the piston insertion machine 2. The second control system 22 also includes a release control button 22a and an advance and return push cylinder button 22b.

FIG. 2 shows a diagrammatic side view of the control system of the present invention with the proximity sensor 10 positioned proximate to the front side 14a of the engine block 14. The proximity sensor 10 may be in contact with the engine block 14, depending on the sensitivity of the proximity sensor 10. The piston assembly 12 and the piston ring compressor 8 are in alignment with the cylinder 16.

Figure 3:
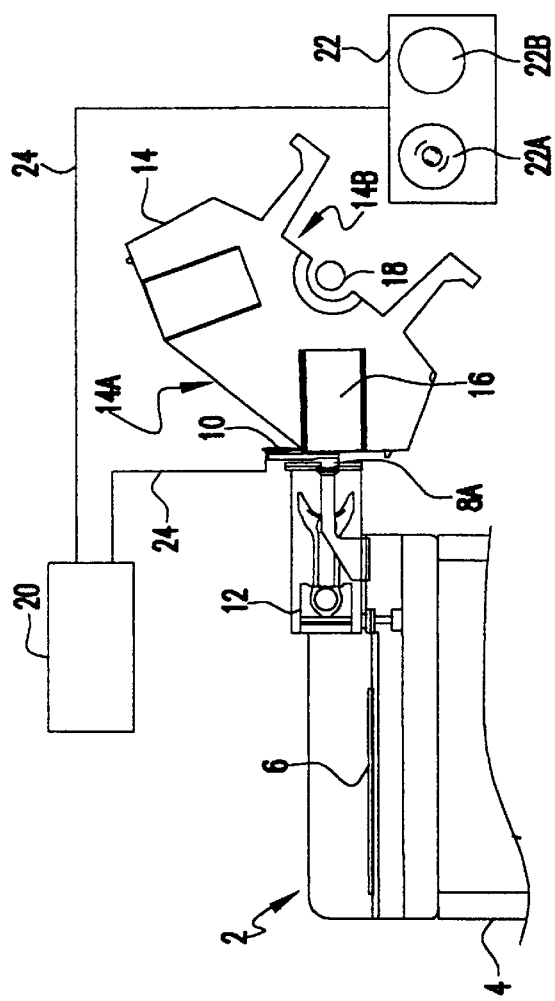
FIG. 3 shows a diagrammatic side view of the transfer control system with an advance and return push cylinder button in a depressed position.

FIG. 3 shows a diagrammatic side view of the control system with the advance and return push cylinder button 22b in a depressed position. FIG. 3 further shows the proximity sensor 10 in close proximity with the front side 14a of the engine block 14. The piston assembly 12 remains in the piston ring compressor 8 at this stage of operation.

Figure 4:
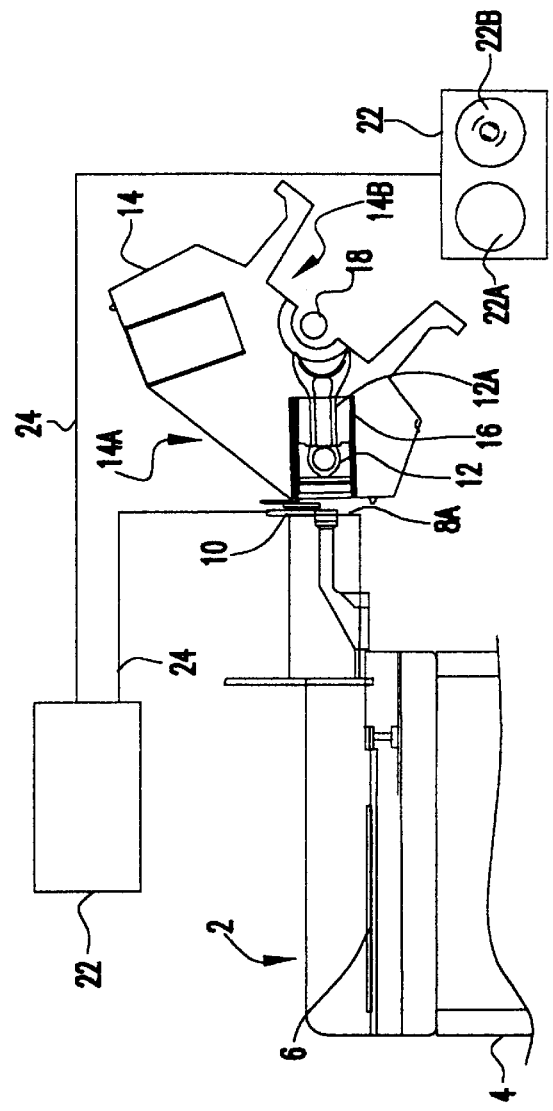
FIG. 4 shows a diagrammatic side view of the transfer control system with a release control button in the depressed position.

FIG. 4 shows a diagrammatic side view of the transfer control system of the present invention with the release control button 22a in the depressed position. The piston assembly 12 is inserted within the cylinder 16, and a connecting rod 12a of the piston assembly 12 is aligned with the crankshaft 18 at the rear side 14b of the engine 14.

Industrial Applicability

In operation, a first technician positions the piston assembly 12 into the piston ring compressor 8. The first technician then aligns the piston ring compressor 8 with the cylinder 16 and advances the piston ring compressor 8 via the first control system 20 to the engine block 14 (as shown in FIG. 1). At this stage, the second control 22 is not activated and cannot provide any control to the piston insertion machine 2. The proximity sensor 10 is in a first state (deactivated) at this stage of operation.

The piston ring compressor 8 is advanced until the proximity sensor 10 is adjacent to or in contact with engine block 14 (FIG. 2). At this stage, the proximity sensor 10 is in a second state (activated) and the first control system 20 is deactivated and all controls are transferred to the second control system 22. The technician at the second control system 22 then depresses the advance and return push cylinder button 22b (FIG. 3). This advances the piston assembly 12 into the cylinder 16 as shown in FIG. 4. The second technician is then capable of aligning and/or connecting the connecting rod 12a with the crankshaft 18.

Once the connecting rod 12a is aligned and/or connected to the crankshaft 18, the second technician then depresses the release control button 22a (FIG. 4). This deactivates the controls of the second control system 22 and transfers the controls again to the first control system 20. In this manner, only one technician is capable of controlling the inserting and aligning of the piston assembly 12 at a single time.

Other aspects and features of the present invention can be obtained from a study of the drawings, the disclosure, and the appended claims.

What is claimed is:

1. A transfer control system, comprising:
    a proximity sensor having a first state and a second state;
    a first control system in communication with the proximity sensor for performing a first operation when the proximity sensor is in the first state;
    a second control system in communication with the first control system for performing a second operation when the proximity sensor is in the second state which then provides a deactivation of the first control system and a transfer of controls to the second control system; and
    a release control button associated with the second control system.

2. The transfer control system of claim 1, including an advance and return push cylinder button associated with the second control system.

3. The transfer control system of claim 1, including a communication link between the proximity sensor and the first control system.

4. The transfer control system of claim 1, including a communication link between the first control system and the second control system.

5. A transfer control system, comprising:
    a proximity sensor having a first state and a second state;
    a first control system in communication with the proximity sensor for performing a first operation when the proximity sensor is in the first state;
    a second control system in communication with the first control system for performing a second operation when the proximity sensor is in the second state which then provides a deactivation of the first control system and a transfer of controls to the second control system; and
    a piston ring compressor, the proximity sensor being located at an end of the piston ring compressor.

6. The transfer control system of claim 5, wherein the first control system controls the piston ring compressor for the first operation when the proximity sensor is in the first state and the second control system controls the piston ring compressor for the second operation when the proximity sensor is in the second state.

7. The transfer control system of claim 6, including:
    a release control button associated with the second control system, the release control button transferring control from the second control system to the first control system; and
    an advance and return push cylinder button associated with the second control system, the advance and return push cylinder button providing the control of the piston ring compressor when the proximity sensor is in the second state.

8. The transfer control system of claim 5, including a communication link between the proximity sensor and the first control system.

9. The transfer control system of claim 5, including a communication link between the first control system and the second control system.

10. A piston insertion machine having a transfer control system, comprising:
    a frame having a base;
    a piston ring compressor mounted on the base, the piston ring compressor having an end;
    a proximity sensor positioned at the end of the piston ring compressor, the proximity sensor having a first state and a second state;
    first control system in communication with the proximity sensor and the piston ring compressor;
    a second control system in communication with the first control system;
    wherein when the second control system is deactivated, control is capable of being transferred to the first control system for performing a first operation; and
    wherein the second control system performs a second operation when the proximity sensor is in the second state which then provides a deactivation of the first control system and transfer of control to the second control system.

11. The piston insertion machine of claim 10, wherein the second control system is in communication with the piston ring compressor via the first control system.

12. The piston insertion machine of claim 10, wherein the second control system is in communication with the piston ring compressor via a communication link.

13. The piston insertion machine of claim 10, wherein the first control system controls the piston ring compressor for the first operation when the proximity sensor is in the first state and the second control system controls the piston ring compressor for the second operation when the proximity sensor is in the second state.

14. The piston insertion machine of claim 13, wherein the second control system is activated when the first control system transfers control to the second control system and is deactivated.

15. The piston insertion machine of claim 10, including:
a release control button associated with the second control system, the release control button transferring control from the second control system to the first control system; and
an advance and return push cylinder button associated with the second control system, the advance and return push cylinder button providing the control of the piston ring compressor.

* * * * *

UNITED STATES PATENT AND TRADEMARK OFFICE
CERTIFICATE OF CORRECTION

PATENT NO. : 6,467,155 B1
DATED : October 22, 2002
INVENTOR(S) : James A. Cook et al.

It is certified that error appears in the above-identified patent and that said Letters Patent is hereby corrected as shown below:

<u>Column 4,</u>
Line 47, insert the word -- a -- in front of "first control system".

Signed and Sealed this

Eleventh Day of February, 2003

JAMES E. ROGAN
*Director of the United States Patent and Trademark Office*